Oct. 3, 1967 V. PAGANINI 3,344,821
DRAG SAW
Filed Feb. 5, 1965
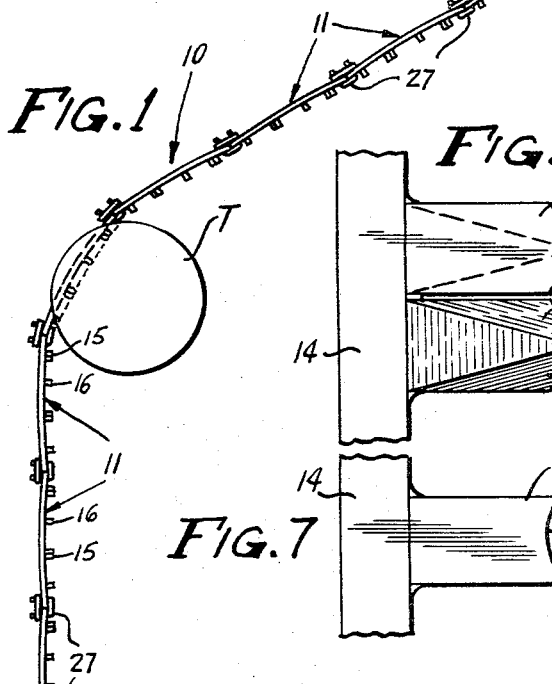
INVENTOR.
VALENTINE PAGANINI
BY Kimmel, Crowell & Weaver
ATTORNEYS.

United States Patent Office 3,344,821
Patented Oct. 3, 1967

3,344,821
DRAG SAW
Valentine Paganini, Billings, Mont., by decree of distribution to Lena Grenko, Laura Vergo, Rena Wait, Anita Parent, and Jean Byers
Filed Feb. 5, 1965, Ser. No. 430,670
5 Claims. (Cl. 143—135)

ABSTRACT OF THE DISCLOSURE

A drag saw consisting essentially of a plurality of arcuate toothed sections connected together flexibly by a clevis extended through openings adjacent the end of each section and aligned openings in a clamping plate, alternate side cutting and drag teeth on the concave side of each section, the side cutting teeth being arranged in pairs and each comprising a triangular member having a flat outer edge, an inner pointed cutting edge and a blade portion having diverging tapered sides, and a drag weight at each end of the saw.

---

This invention relates to a drag saw, and has as its primary object the provision of an improved drag saw of the type which is adapted to have a source of power applied, interchangeably to either end, for drawing the saw across a tree or the like to provide a transverse cut closely adjacent ground level for felling the tree and reducing the resultant stump to a minimum.

A further object of the invention is the provision of a device of this character comprised of a multiplicity of links or saw sections, each provided with a plurality of teeth welded thereto, the sections being detachably connected in order that removal and replacement of a damaged or broken section may be effected with a minimum of effort and difficulty.

A further object of the invention is the provision of a device of this nature characterized by extreme simplicity of construction and the absence of gearing or other complex mechanical arrangements.

A further object of the invention is the provision of a device of this character which may be readily operated by the application of power at either end, the movement of the other end being controlled by a relatively heavy drag weight.

A further object of the invention is the provision of means whereby the selective connection of the source of power to either end of the device will permit reciprocating action to fell large trees, requiring more than one passage of the saw therethrough.

Still another object of the invention resides in the provision of an improved drag weight of a shape characterized to reduce to a minimum the power necessary for pulling the same through undergrowth close to the ground.

A further object of the invention is the provision of a device of this character which may be employed to saw logs or timber on the ground at ground level.

Still another object of the invention is the provision of depending lugs or bolts on the underside of the drag weights, thus retarding the drag and causing the saw teeth to bite into the trunk.

Still another object of the invention is the provision of a device of this nature which is sturdy and durable in construction, reliable and efficient in operation, and relatively simple to manufacture, assemble, maintain and utilize.

Other objects reside in the combinations of elements, arrangements of parts, and features of construction.

Still other objects will in part be obvious and in part be pointed out as the description of the invention proceeds and shown in the accompanying drawing wherein:

FIGURE 1 is a top plan view of a drag saw constructed in accordance with the instant invention associated with a tree or the like which it is desired to fell;

FIGURE 2 is a fragmentary side elevational view of one of the chain sections or link shown as connected to portions of adjacent sections;

FIGURE 3 is a bottom view of the structure of FIGURE 2;

FIGURE 4 is an enlarged sectional view taken substantially along the line 4—4 of FIGURE 3 as viewed in the direction indicated by the arrows;

FIGURE 5 is a sectional view taken substantially along the line 5—5 of FIGURE 4 as viewed in the direction indicated by the arrows;

FIGURE 6 is a sectional view taken substantially along the line 6—6 of FIGURE 3 as viewed in the direction indicated by the arrows;

FIGURE 7 is a sectional view taken substantially along the line 7—7 of FIGURE 6 as viewed in the direction indicated by the arrows;

FIGURE 8 is a sectional view on an enlarged scale taken substantially along the line 8—8 of FIGURE 3 as viewed in the direction indicated by the arrows;

FIGURE 9 is a sectional view taken substantially along the line 9—9 of FIGURE 8 as viewed in the direction indicated by the arrows;

FIGURE 10 is an enlarged top plan view of the constructional detail; and

FIGURE 11 is a side elevational view, certain concealed parts being indicated in dotted lines, of the structure of FIGURE 10.

Similar reference characters refer to similar parts throughout the several views of the drawing.

Having reference now to the drawings in detail, and more particularly to FIGURE 1, a drag saw constructed in accordance with the instant invention is generally indicated at 10, and arranged to saw through the trunk of a vertical object such as a tree T. The drag saw is comprised of a plurality of individual links, each generally indicated at 11, provided with teeth, to be more fully described hereinafter.

At each end of the link assembly is a drag weight, generally indicated at 12, to the free end of which is connected a hook or link 13, which is adapted to be secured to any suitable source of power, such as a tractor, a jeep, a team of horses, or if sufficient manpower is available to be manually drawn.

Each of the saw sections or links 11 includes an arcuate bar member 14, having a plurality of teeth 15 and 16, alternately spaced thereon, there being an opening 17 provided adjacent each end of each link. The teeth are arranged on the concave side of the arcuate member, and comprise in the case of teeth 15 side cutting teeth, as best shown in FIGURES 4 and 5, arranged in pairs. Each of teeth 15 consists of a substantially triangular member 18 having a straight or flat outer edge 19, and an inner cutting edge characterized by a sharp point 20 and a blade section 21, having diverging tapered sides 22, the teeth of each pair being arranged with their flat side substantially perpendicular to the bar 14, and their tapered inner cutting sides in confronting spaced relation. These teeth serve to sever the sides of the curf, and by virtue of the arrangement described act in either direction, regardless of which end of the saw receives the application of power. The teeth 16, which constitute drag teeth, serve to sever the wood at the bottom of the kerf, and similarly to clean the kerf, and include a pair of transverse cutting edges 25, separated by a concaved depression 26, so that the edges bite into the wood at the bottom of the kerf, and serve to clean sawdust or analogous material therefrom.

The saw sections or links are connected together by clevises 27, the legs of which are extended between the openings 17 and adjacent ends of adjacent links 14, and thence through openings 28 and relatively short clamping plates 29. The legs of each clevis have aligned openings 30, in the portions extending beyond the plates 29, and cotter pins 31 are extended through these openings, for the purpose of locking the plates and adjacent links in related assembly.

The openings 17 at the outer ends of either section of the saw may be connected to eyes 34 which are formed at the ends of reinforcing rods 35 which extend longitudinally through the drag weights 12. Alternatively the openings 17 may be connected by links 33 to a chain 34a which is in turn connected to a source of power. Each drag weight 12 is comprised of a diamond-shaped block of concrete or similar heavy material, and preferably weighs approximately 300 pounds. Imbedded in the concrete are additional longitudinal reinforcing wires 36, as well as vertical reinforcements 37, the lower ends 38 of which project downwardly from the bottom surface of the weights and engage in the ground G to provide additional drag. By virtue of the diamond shape of the weights 12 they may be drawn through heavy undergrowth or the like at ground level, without material entanglement thereof, while the spikes 38 serve to further retard any deviation of the saw from its normal path of progress.

In the use and operation of the device an end link of the chain is positioned adjacent a tree trunk, on the side opposite that toward which the trunk normally leans, and the chain bent at an angle as shown in FIGURE 1 about the trunk. One end of the saw is then connected through links 40 attached to cables 41 or the like, which are in turn connected to any suitable source of power such as a tractor, or a jeep, or a team of horses, as may be desired. The weight is secured directly to the last link of the opposite end of the saw. When the power is applied the saw is drawn for so much of its length as may be necessary against the tree trunk, and frequently in the case of a relatively small or medium-sized tree the entire trunk may be severed in a single operation. In the case of very large trees, an additional stroke or strokes may be required, in which case the source of power is removed and connected to the opposite end of the chain for reverse movement. The tractor or the like pulls at an angle of approximately 30°, and must be at a distance sufficiently remote from the tree to avoid danger of the tree falling on the tractor or operator. Obviously extension cables may be attached to either end of the saw if desired.

Control of the tractor or other source of power may be governed by an operator close to the base of the tree and communicated to the operator of the tractor by appropriate visual or audible signals.

The construction of the teeth enables a cutting action to be effected regardless of the direction of the pull on the chain.

When it is desired to saw logs or tree trunks in horizontal position, the chain is extended over the top of such logs and heavy spikes may be driven into the log on either side of the saw until the teeth are imbedded in the log far enough to guide itself. Guide stakes may be employed to guide the power operator to make a straight cut through the log, squared with the log. To simplify and facilitate sawing. power and weights are preferably interchangeably detached and attached with quick-action hooks 35a.

The first section or two of the saw connected with the weight need not have teeth.

Any size tree may be sawed substantially level with the ground by using stronger materials and extending the length of the chain saw.

In some instances when it is necessary to achieve a greater angle for accurate cutting, jacks or trestles for lifting the log may be employed.

From the foregoing it will now be seen that there is herein provided an improved drag saw, which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a drag saw, in combination, a plurality of arcuate saw sections each having a plurality of alternate side cutting and drag teeth welded to an edge thereof, means for connecting a plurality of saw sections in aligned relation to form the saw, a drag weight at each end of said saw, means at each end of said saw for connection to a source of power, each saw section being provided with an opening at each end, said means for connecting said sections comprising a clevis having one leg insertable through the hole in the adjacent end of adjacent saw sections, the legs of said clevis having aligned openings therein, and a cotter pin extended through said openings.

2. The structure of claim 1 wherein each weight is of diamond shape to facilitate passage through ground level brush.

3. The structure of claim 1 wherein each weight has a plurality of ground engaging spikes depending from the underside thereof.

4. The structure of claim 1 wherein the side cutting teeth are arranged in pairs, and each consists of a substantially triangular member having a flat outer edge, an inner cutting edge terminating in a sharp point and a blade section having diverging tapered sides.

5. The structure of claim 4 wherein the drag teeth are formed with a pair of transverse cutting edges separated by a concave depression.

References Cited

UNITED STATES PATENTS

| | | | |
|---|---|---|---|
| 325,364 | 9/1885 | Shipe | 143—135 |
| 1,127,347 | 2/1915 | Baldwin et al. | 143—32 |
| 2,751,736 | 6/1956 | Hessemer | 144—34 |
| 3,133,395 | 5/1964 | Farmer | 143—135 |

DONALD R. SCHRAN, *Primary Examiner.*